United States Patent [19]

Kamiya et al.

[11] Patent Number: 4,888,585

[45] Date of Patent: Dec. 19, 1989

[54] INFORMATION SIGNAL TRANSMITTING DEVICE

[75] Inventors: Norikazu Kamiya, Toyota; Katsumi Murai, Anjo, both of Japan

[73] Assignee: Aisan Kogyo Kabushiki Kaisha, Oobu, Japan

[21] Appl. No.: 263,523

[22] Filed: Oct. 27, 1988

[30] Foreign Application Priority Data

Oct. 30, 1987 [JP] Japan ............................... 62-276921

[51] Int. Cl.[4] ............................................... H04Q 9/00

[52] U.S. Cl. ............................. 340/825.340; 340/572; 340/825.300; 340/825.540; 340/825.680; 340/825.620

[58] Field of Search ....................... 340/825.34, 825.54, 340/825.3, , 825.35, 825.62, 825.68, 825.69, 825.57, 572, 505, 539, ; 235/439, 454

[56] References Cited

U.S. PATENT DOCUMENTS

| | | | |
|---|---|---|---|
| 3,964,024 | 6/1976 | Hutton et al. | 340/825.34 |
| 4,257,031 | 3/1981 | Kirner et al. | 340/825.3 |
| 4,338,601 | 7/1982 | Nance-Kivell | 340/825.34 |
| 4,388,524 | 6/1983 | Walton | 340/825.3 |
| 4,517,563 | 5/1985 | Diamant | 340/825.54 |
| 4,630,044 | 12/1986 | Polzer | 340/825.34 |
| 4,807,140 | 2/1989 | Saulnier | 340/825.54 |

*Primary Examiner*—Donald J. Yusko
*Assistant Examiner*—Eric Pudpud
*Attorney, Agent, or Firm*—Oblon, Spivak, McClelland, Maier & Neustadt

[57] ABSTRACT

An information signal transmitting device which can transmit a large amount of information rapidly and readily with a simplified construction of a reduced size and can be produced at a reduced cost. The device comprises a movable unit and a fixed unit between which an information signal is transmitted using an electromagnetic wave or an ultrasonic wave as a transmitting medium. The movable unit includes a signal receiving means for converting an information signal transmitted from the fixed unit into a binary signal, a shift register for storing an output of the signal receiving means therein, and a signal transmitting means for transmitting one bit of an information signal outputted from the shift register. The fixed unit includes a signal receiving means for converting an information signal from the movable unit into a binary signal, a signal transmitting means for transmitting an information signal to the movable unit, a data setter on which an information data is to be set, and a sending and reading controlling means for alternately sending one bit of the information data set on the data setter to the signal transmitting means and reading one bit of an output of the signal receiving means.

1 Claim, 6 Drawing Sheets

(RRIOR ART)

INFORMATION SIGNAL TRANSMITTING DEVICE

BACKGROUND OF THE INVENTION

1. Field of the Invention:

This invention relates to an information signal transmitting device for transmitting information, for example, in the form of identification codes between a movable unit mounted on a movable element such as a pallet on a production line of a factory or a work on such a pallet and a fixed unit mounted on a fixed element in an opposing relationship to the movable unit.

2. Description of the Prior Art:

One of conventional information signal transmitting devices of the type mentioned which are used commonly is such an information signal transmitting device of the mechanical type as shown in FIG. 6. Referring to FIG. 6, the information signal transmitting device shown includes a combination of a movable unit 33 including a block 31 secured to a pallet P on a conveyor C and a plurality of storage pins 32 made of a metal and supported for movement on the block 31 such that they may be individually pushed in or pulled out on the block 31, and a reader 35 including a plurality of contactless switches 34 disposed along the conveyor C such that they may face to the respective storage pins 32 at a predetermined stopping position of the pallet P. The storage pins 32 are selectively set in position by means of a pin setting device 39 which includes a plurality of air cylinders 37, a storage pin pushing and drawing piece 36 provided at an end of a rod of each of the air cylinders 37, and a solenoid valve 38 for driving each of the air cylinders 37.

Since the conventional device, however, is of the structure wherein the storage pins 32 are slidably moved, abrasion occurs readily at sliding portions of the storage pins 32 and at contacting portions of the pin setting device 39 with the storage pins 32, which will deteriorate operation of the storage pins 32, make the structure of the entire device complicated and cause the device to require an increased installation spacing. Particularly where the number of the storage pins 32 is increased in order to increase the amount of information to be stored, a large occupation spacing is required.

SUMMARY OF THE INVENTION

It is an object of the present invention to provide an information signal transmitting device which can transmit a large amount of information rapidly and readily with a simplified construction of a reduced size and can be produced at a reduced cost.

In order to attain the object, according to the present invention, an information signal transmitting device comprises a movable unit and a fixed unit between which an information signal is transmitted using an electromagnetic wave or an ultrasonic wave as a transmitting medium, the movable unit including a signal receiving means for converting an information signal transmitted from the fixed unit into a binary signal, a shift register of the serial inputting and serial outputting type for storing an output of the signal receiving means therein, and a signal transmitting means for transmitting to the fixed unit an information signal by one bit which is outputted from the shift register each time an information signal of one bit is inputted ot the shift register, the fixed unit including a signal receiving means for converting an information signal transmitted thereto from the movable unit into a binary signal, a signal transmitting means for transmitting an information signal to the movable unit, a data setter on which an information data is to be set, and a sending and reading controlling means for alternately effecting sending of a data to send one bit of the information data set on the data setter to the signal transmitting means of the fixed unit and reading of one bit of an output of the signal receiving means of the fixed unit.

In use of the information signal transmitting device in accordance with the present invention, the movable unit is mounted on each of moving elements such as pallets on a conveyor or items to be transported on such pallets while a plurality of such fixed units are mounted either on the ground or on a fixed element of the equipment such as a fixed frame along the passage of the moving elements. On a fixed unit, an information data to be written into a movable unit such as an identification code of an item to be or being transported, an operation instruction code or an inspection data is set to the data setter of the fixed unit by manual operation or the like of the data setter. When the movable unit reaches and is stopped at a predetermined position at which an information signal can be transmitted between the movable unit and the fixed unit, the sending and reading controlling means of the fixed unit outputs the information data set on the data setter by one bit to the signal transmitting means of the fixed unit by which the one bit of the information data is transmitted to the signal receiving means of the movable unit. The one bit of the information data is thus converted into a binary signal by the signal receiving means of the movable unit and then inputted to and stored in the shift register. Upon such inputting of the one bit of the information data, an information data which has been stored in the shift register so far is overflowed by one bit from the shift register, and the overflowed one bit of the information data is transmitted to the fixed unit by means of the signal transmitting means of the movable unit. The information data is converted into a binary signal now by the signal receiving means of the fixed unit and read by the sending and writing controlling means. After then, writing of the set data on the data setter by one bit into the shift register and reading of the information data overflowed by one bit from the shift register are performed alternately in a similar manner until transmission of all of the bits of the information data is completed between the movable unit and the fixed unit.

With the information signal transmitting device according to the present invention, since transmission of an information signal is performed in a contactless manner, the device will suffer from little abrasion and from little trouble caused by abrasion, and transmission of a large amount of information between the movable unit and the fixed unit can be made rapidly and readily with the device of a small size. Further, since a shift register is used as a storage means of the movable unit, the information signal transmitting device can be produced at a reduced cost with a simplified structure and the storage capacity thereof can be increased readily.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE PREFERRED EMBODIMENT

Figure 1:
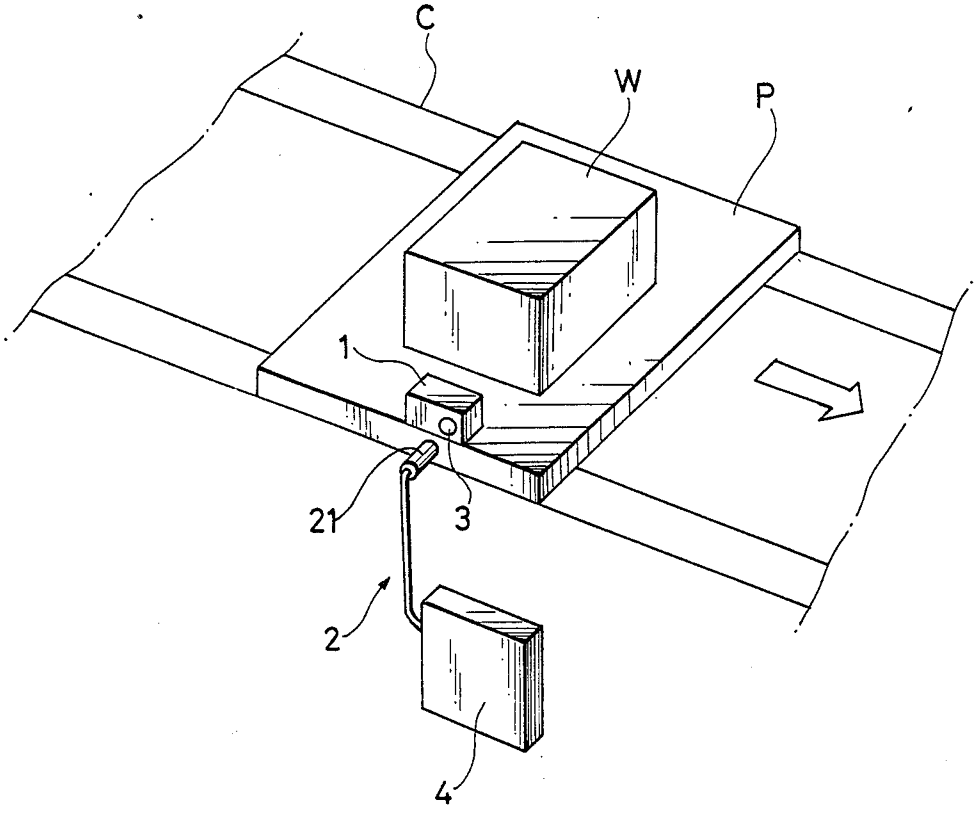
FIG. 1 is a perspective view of an information signal transmitting device showing a preferred embodiment of the present invention.

Referring first to FIG. 1, there is shown an information signal transmitting device according to the present invention. The information signal transmitting device shown includes a movable unit 1 mounted on a pallet P which is transmitted by means of a conveyor C. The information signal transmitting device further includes a fixed unit 2 secured to the ground. The fixed unit 2 includes a coil 21 disposed at a location at which it can face to a coil 3 of the movable unit 1, and a box 4 connected to the coil 21 and containing therein a microcomputer system 25 which will be hereinafter described and some other appliances. The movable unit 1 is mounted on each of a plurality of pallets P on the conveyor C while the fixed unit 2 is provided at each of a plurality of locations along the conveyor C at which a pallet P is stopped temporarily.

Figure 2:
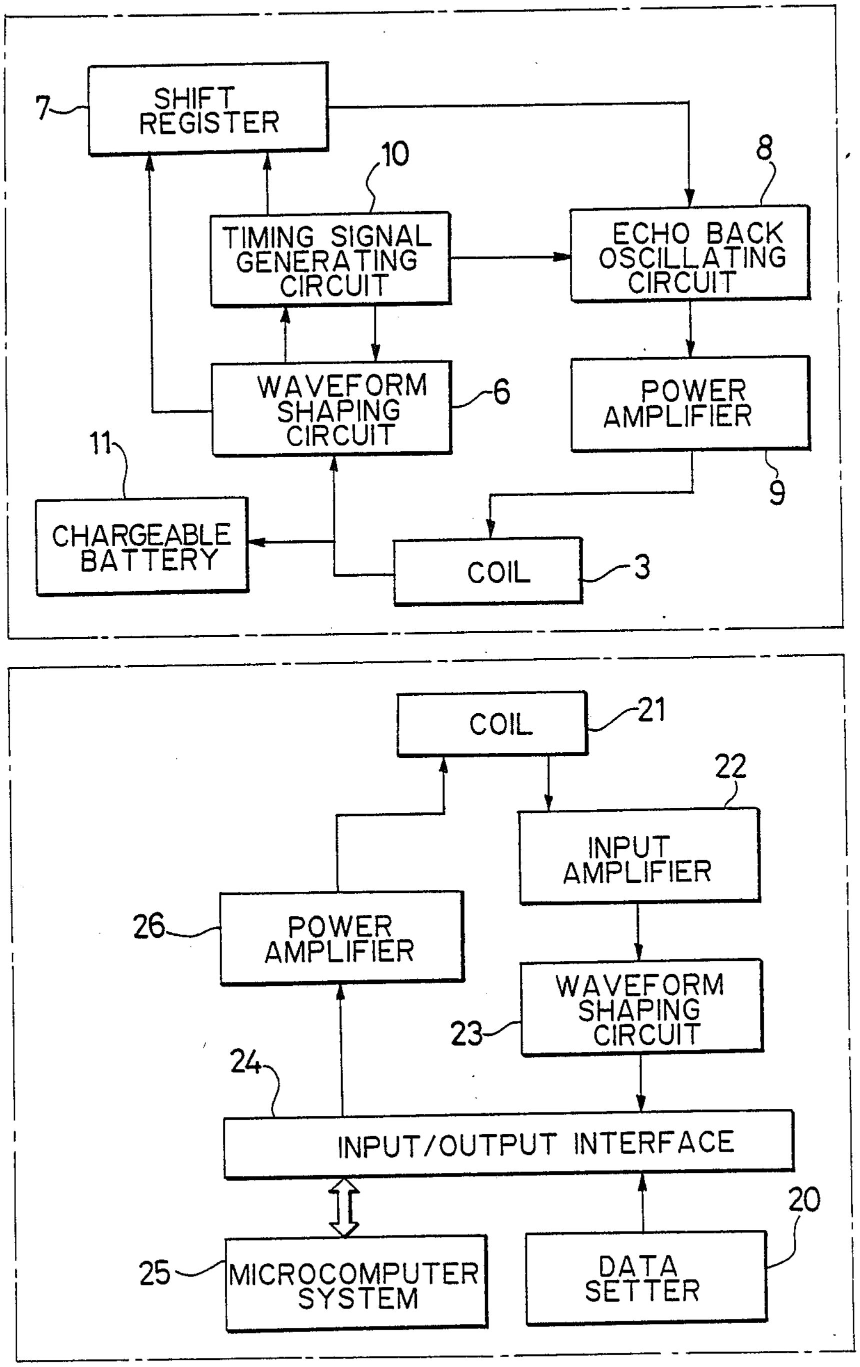
FIG. 2 is a block diagram showing an electric circuit of the information signal transmitting device of FIG. 1.
Figure 3:
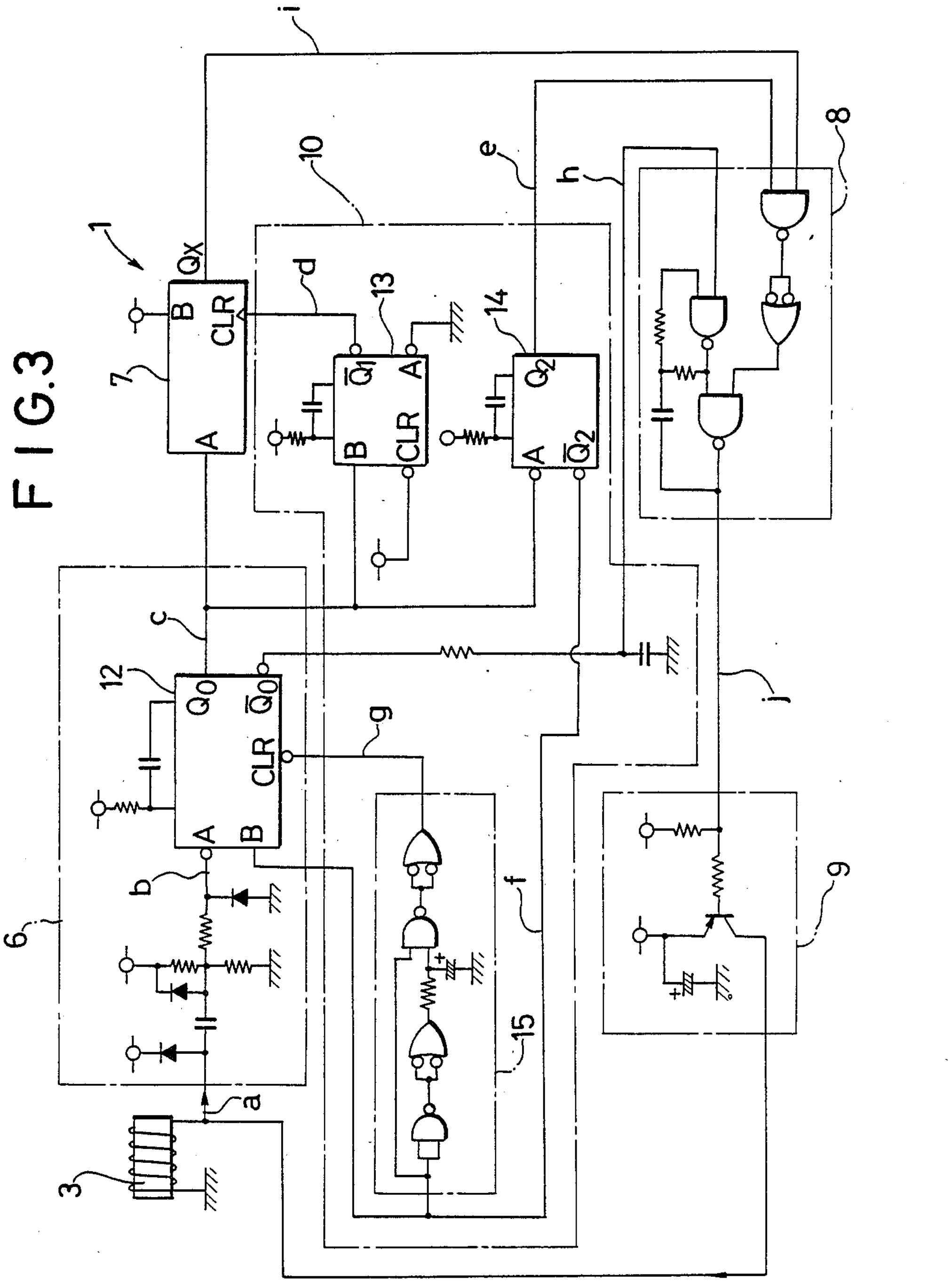
FIG. 3 is a circuit diagram showing a detailed circuit construction of a movable unit of the information signal transmitting device of FIG. 1.
Figure 4:
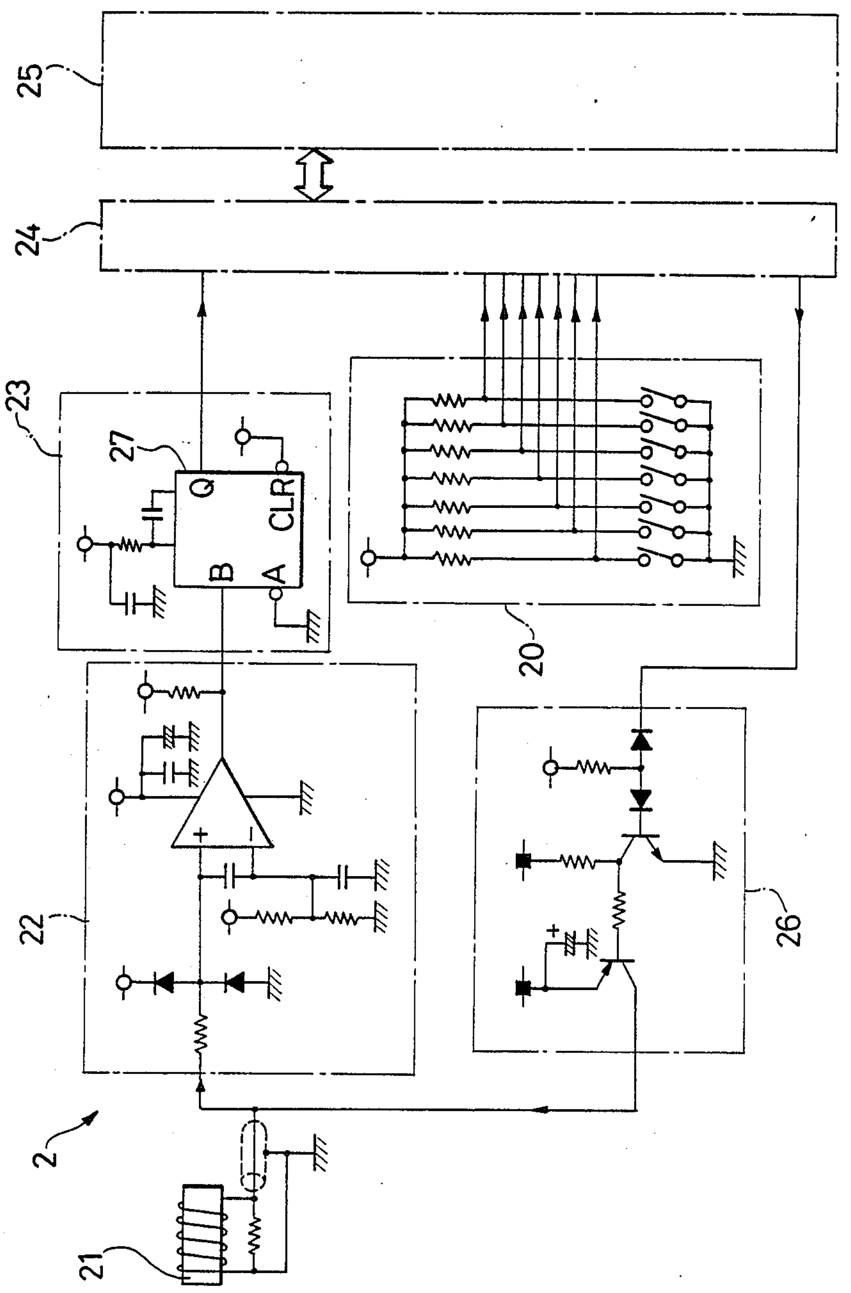
FIG. 4 is a circuit diagram showing a detailed circuit construction of a fixed unit of the information signal transmitting device of FIG. 1.

Referring now to FIGS. 2 to 4, the movable unit 1 includes the coil 3 which serves both as a transmitter and a receiver, a waveform shaping circuit 6 for shaping the waveform of an excitation voltage of the coil 3, an 8-bit shift register 7 of the serial inputting and serial outputting type for storing a binary signal output of the waveform shaping circuit 6, an echo back oscillating circuit 8 for transmitting an output of the shift register 7, a power amplifier 9 for driving the coil 3, a timing signal generating circuit 10 for controlling writing of the shift register 7, and a battery 11 of the charging type for supplying a power to allow the stored contents of the shift register 7 to be maintained. The waveform shaping circuit 6 includes a re-triggerable one-shot multivibrator 12 (hereinafter referred to briefly as IC 12) as a principal component while the timing signal generating circuit 10 is composed of a pair of one-shot multivibrators 13 and 14 (hereinafter referred to briefly as IC 13 and IC 14, respectively) and a rising delay circuit 15 as principal components.

Meanwhile, the fixed unit 2 includes a data setter 20 of the switch type including a total of 7 contacts for setting a 7-bit information data to be written into the movable unit 1, the coil 21 serving as a transmitter and a receiver and adapted to be electromagnetically coupled to the coil 3 to transmit and receive a signal to and from the coil 3, an input amplifier 22 for adjusting the voltage of a signal received at the coil 21, a waveform shaping circuit 23 for shaping the waveform of a signal received at the coil 21, an input/output interface 24, the microcomputer system 25 of the Z80 type for causing a 7-bit data of the data setter 20 to be outputted bit by bit as a serial pulse train from the fixed unit 2 and for reading the waveform of an output of the waveform shaping circuit 23 to discriminate whether it is a logical "1" or "0" in an alternate relationship with such outputting of the 7-bit data, and a power amplifier 26 for power amplifying an output pulse train signal of the microcomputer system 25. The waveform shaping circuit 23 is composed of a re-triggerable one-shot multivibrator 27 as a principal component.

Figures 5A, 5B:
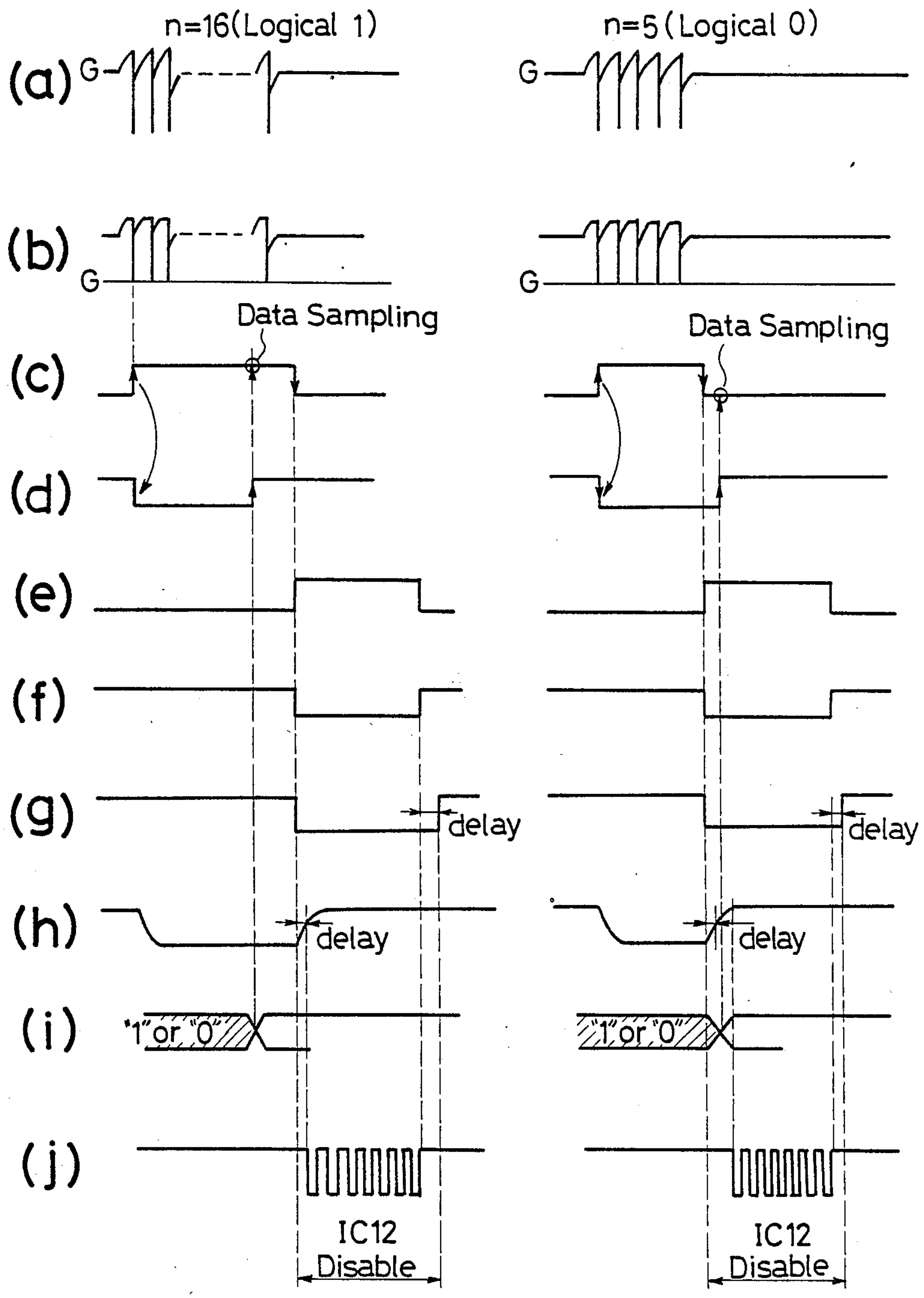
FIGS. 5A and 5B are waveform diagrams illustrating different operations of the movable unit of FIG. 3.
Figure 6:
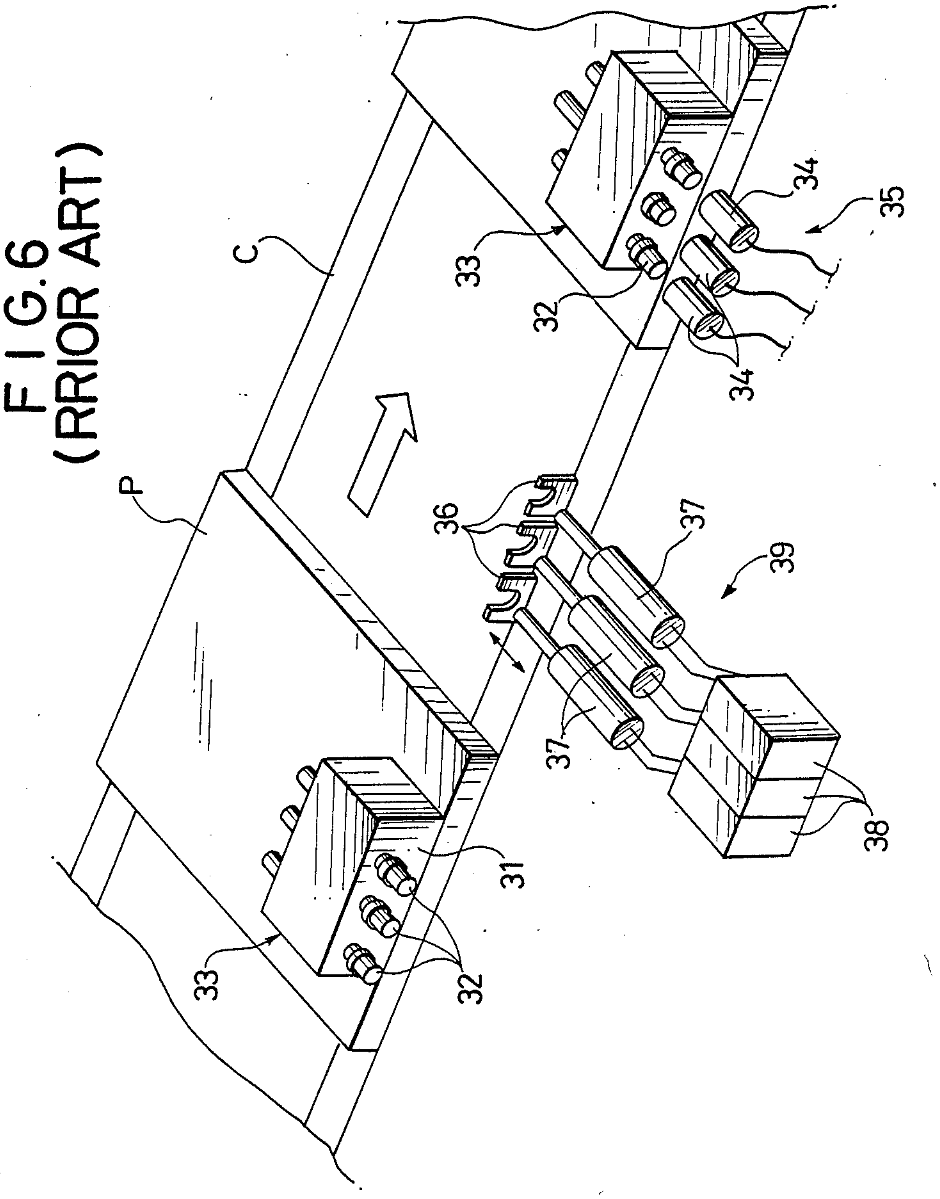
FIG. 6 is a perspective view of an exemplary one of conventional information signal transmitting devices.

Subsequently, operation of the device having such a construction as described above will be described. At first, an information data such as an identification code of a work W or an operation instruction code is set as a 7-bit data to the data setter 20 by manual operation of the data setter 20. After a pallet P is stopped at a predetermined position in which the coil 3 thereon faces to the coil 21, the microcomputer system 25 reads the information data of the data setter 20 by way of the input/output interface 24. In case the first bit of the 7-bit data is ON (logical "1"), the microcomputer system 25 outputs a pulse train of 16 pulsed by way of the input/output interface 24, but on the contrary in case the first bit of the 7-bit data is OFF (logical "0"), the microcomputer system 25 outputs a pulse train of 5 pulses by way of the input/output interface 24. The output pulses are amplified by the power amplifier 26 and excite the coil 21. Consequently, an excitation voltage (waveform (a) of FIG. 5A or 5B) corresponding to the pulse signal is generated in the coil 3 of the movable unit 1 in the electromagnetically coupled position to the coil 21 so that negative trigger pulses (waveform (b) of FIG. 5A or 5B) are produced in the waveform shaping circuit 6. The IC 12 thus triggered by any of the negative trigger pulses so that it produces a positive pulse (waveform (c) of FIG. 5A or 5B) at an output $Q_0$ thereof. The positive pulse continues while the negative trigger pulses are successively received by the IC 12. Meanwhile, the IC 13 is triggered by a rising edge of the output $Q_0$ of the IC 12 and thus changes an output $Q_1$ (waveform (d) of FIG. 5A or 5B) thereof into the logical "0". The output $Q_1$ of the IC 13 then rises to the logical "1" after lapse of a preset interval of time, and in response to the rising edge of the output $\overline{Q}_1$, the output $\overline{Q}_0$ of the IC 12 is taken into the shift register 7 as an input signal. In this instance, in case the number of the input pulses received by the coil 3 is 16 as shown in FIG. 5A, the logical "1" is inputted to the shift register 7, but in case the number of the input pulses received by the coil 3 is 5 as shown in FIG. 5B, the logical "0" is inputted to the shift register 7. Upon such inputting, a stored data signal $Q_x$ (waveform (i) of FIG. 5A or 5B) is overflowed by one bit from the shift register 7 and inputted to the echo back oscillating circuit 8. Meanwhile, the IC 14 of the timing signal generating circuit 10 is triggered by a falling edge of the output $Q_0$ of the IC 12 and outputs an output $Q_2$ (waveform (e) of FIG. 5A or 5B) and another output $Q_2$ (waveform (f) of FIG. 5A or 5B) for a preset interval of time. Since the output $Q_2$ is received as an echo back oscillation preparing signal by the echo back oscillating circuit 8, when the output $Q_x$ of the shift register 7 is the logical "1", the echo back oscillating circuit 8 starts to oscillate pulses (waveform (j) of FIG. 5A or 5B) at a point of time at which it receives a rising edge signal (waveform (h) of FIG. 5) which is delayed with respect to the other output $\overline{Q}_0$ of the IC 12. To the contrary, when the output $Q_x$ of shift register 7 is the logical "0", the echo back oscillating circuit 8 does not oscillate pulses. The output pulses of the echo back oscillating circuit 8 are amplified by the power amplifier 9 and excite the coil 3 so that they are transmitted to the fixed unit 2. In order to prevent the output pulses of the echo back oscillating circuit 8 from being inputted again to the shift register 7 in this instance, the output $Q_0$ of the IC 12 is inhibited by the output $\overline{Q}$hd 2 (waveform (f) of FIG. 5A or 5B) of the IC 14 and a delay signal (waveform (g) of FIG. 5A or 5B) produced by the rising edge delay circuit 15.

In response to the oscillation signal of the coil 3, an excitation voltage is generated in the coil 21 of the fixed unit 2. The voltage signal is amplified to a predetermined amplitude by the input amplifier 22 and converted into a pulse of a fixed pulse width by the waveform shaping circuit 23. The microcomputer system 25 reads the output signal of the waveform shaping circuit 23 after lapse of a predetermined interval of time after completion of the preceding outputting of the first bit of the set data of the data setter 20 described hereinabove, and then discriminated whether the read signal is the logical "1" (output signal is present) or the logical "0" (output signal is absent), whereafter it causes storing of the information into an internal memory thereof or transmission of the information to an external appliance such as a robot.

Since writing (inputting to the shift register 7) and reading of the information data for the first bits is thus completed, transmission of the information data for the second to seventh bits is executed successively in a similar manner. After completion of transmission of the seventh bits of the information data, the coil 21 may be energized for a predetermined interval of time as required so that the battery 11 of the charging type may be charged by a positive pulse of an excitation voltage produced in the coil 3.

Having now fully described the invention, it will be apparent to one of ordinary skill in the art that many changes and modifications can be made thereto without departing from the spirit and scope of the invention as set forth herein. For example, a microcomputer system of any other type, a programmable controller (sequencer) or the like may be employed for the sending and reading controlling means. Meanwhile, each of the signal transmitting means and the signal receiving means of the movable unit and the fixed unit may employ any modulating or demodulating system other than the system described hereinabove. Further, in addition to such a data setter of the on-off switch type as described hereinabove, a keyboard of the microcomputer system may be used for the data setter. In addition, while in the embodiment described above transmission of an information signal between the movable unit and the fixed unit is effected by way of an electromagnetic coupling between the coils 3 and 21, the present invention can be applied also to an information signal transmitting device wherein not only a radio wave ranging from low frequency waves to microwaves as in the embodiment described above but an ultrasonic wave, light ranging from infrared rays to ultraviolet rays, laser light or the like is employed as a transmitting medium.

What is claimed is:

1. An information signal transmitting device, comprising a movable unit and a fixed unit between which an information signal is transmitted using one of an electromagnetic wave and an ultrasonic wave as a transmitting medium, said movable unit including a signal receiving means for converting an information signal transmitted from said fixed unit into a binary signal, a shift register of the serial inputting and serial outputting type for storing an output of said signal receiving means therein, and a signal transmitting means for transmitting to said fixed unit an information signal by one bit which is outputted from said shift register each time an information signal of one bit is inputted to said shift register, said fixed unit including a signal receiving means for converting an information signal transmitted thereto from said movable unit into a binary signal, a signal transmitting means for transmitting an information signal to said movable unit, a data setter on which an information data is to be set, and a sending and reading controlling means for alternately effecting sending of a data to send one bit of the information data set on said data setter to said signal transmitting means of said fixed unit and reading of one bit of an output of said signal receiving means of said fixed unit.

* * * * *